(12) United States Patent
Wang et al.

(10) Patent No.: US 10,539,851 B2
(45) Date of Patent: Jan. 21, 2020

(54) METHOD FOR CHANGING STATES OF ELECTROCHROMIC FILM

(71) Applicant: FURCIFER INC., Menlo Park, CA (US)

(72) Inventors: Jian Wang, Menlo Park, CA (US); Yan Zhou, Menlo Park, CA (US)

(73) Assignee: Furcifer Inc., Fremont, CA (US)

( * ) Notice: Subject to any disclaimer, the term of this patent is extended or adjusted under 35 U.S.C. 154(b) by 0 days.

(21) Appl. No.: 15/913,669

(22) Filed: Mar. 6, 2018

(65) Prior Publication Data

US 2019/0278147 A1    Sep. 12, 2019

(51) Int. Cl.
*G02F 1/1523* (2019.01)
*G02F 1/1503* (2019.01)

(52) U.S. Cl.
CPC .......... *G02F 1/1525* (2013.01); *G02F 1/1503* (2019.01)

(58) Field of Classification Search
CPC ........ G02F 1/155; G02F 1/153; G02F 1/1523; G02F 1/1533; G02F 1/157
USPC ....................................................... 359/265
See application file for complete search history.

(56) References Cited

U.S. PATENT DOCUMENTS

| 5,138,481 A * | 8/1992 | Demiryont ............. C23C 10/18 359/269 |
| 5,365,365 A | 11/1994 | Ripoche et al. |
| 2004/0150867 A1 * | 8/2004 | Lee ...................... G02F 1/1523 359/273 |
| 2016/0202590 A1 | 7/2016 | Ziebarth et al. |
| 2017/0298682 A1 | 10/2017 | Wang et al. |

OTHER PUBLICATIONS

Search Report for European Application No. 19160709.2, dated Jul. 12, 2019, 11 pages.

* cited by examiner

*Primary Examiner* — Mohammed A Hasan

(57) ABSTRACT

The disclosure relates generally to a method of changing an optical state of an electrochromic film. The electrochromic film may have a plurality of optical states. The method may include selecting a desired state of the plurality of optical states; injecting electric charges into the electrochromic film; monitoring an amount of the electric charges injected into the electrochromic film; and stopping injecting the electric charges when the electric charges reaches a pre-set amount corresponding to the desired state.

20 Claims, 11 Drawing Sheets

METHOD FOR CHANGING STATES OF ELECTROCHROMIC FILM

TECHNICAL FIELD

The present disclosure relates generally to electrochromic films, and in particular, to methods for changing states of electrochromic films.

BACKGROUND

Electrochromism is a phenomenon displayed by some materials of reversibly changing optical properties by using bursts of charges to cause electrochemical redox (reduction and oxidation) reactions in electrochromic materials. The optical properties may include transmittance, reflectance, absorptance and emittance. In particular, electrochromic materials exhibit a reversible color changes. The optical state of an electrochromic material depends on the amount of charge injected or extracted. The optical state of an electrochromic film may refer to lightness, transparency, color, reflectance, etc. The electrochromic film's optical state could be set at any state by controlling the amount of charges. In an application of smart windows, electrochromic films are integrated with the glass window to become serviceable. Electric controller are used to control the electrochromic films integrated with glass windows (i.e., smart windows).

In this disclosure, we propose different methods for changing optical states of electrochromic materials.

SUMMARY

One aspect of the present disclosure is directed to a method of changing an optical state of an electrochromic film. The electrochromic film may have a plurality of optical states. The method may include selecting a desired state of the plurality of optical states; injecting electric charges into the electrochromic film; monitoring an amount of the electric charges injected into the electrochromic film; and stopping injecting the electric charges when the electric charges reaches a pre-set amount corresponding to the desired state.

Another aspect of the present disclosure is directed to another method of changing an optical state of an electrochromic film. The electrochromic film may have a plurality of optical states. The method may include selecting a desired state of the plurality of optical states; extracting electric charges from the electrochromic film; monitoring an amount of the electric charges extracted from the electrochromic film; and stopping extracting the electric charges when the electric charges reaches a pre-set amount corresponding to the desired state.

Another aspect of the present disclosure is directed to another method of changing an optical state of an electrochromic film. The method may include setting a plurality of pre-determined optical states of the electrochromic film; determining an amount of electric charges corresponding to each of the plurality of pre-determined optical states; selecting a desired state of the plurality of pre-determined optical states; and adjusting an amount of electric charges within the electrochromic film to the determined amount of electric charges corresponding to the selected desired state.

Other objects, features and advantages of the described embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which.

DETAILED DESCRIPTION OF THE PREFERRED EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Unless the context requires otherwise, throughout the present specification and claims, the word "comprise" and variations thereof, such as, "comprises" and "comprising" are to be construed in an open, inclusive sense, that is as "including, but not limited to". Numeric ranges are also inclusive of the numbers defining the range. Additionally, the singular forms "a", "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Figure 1:
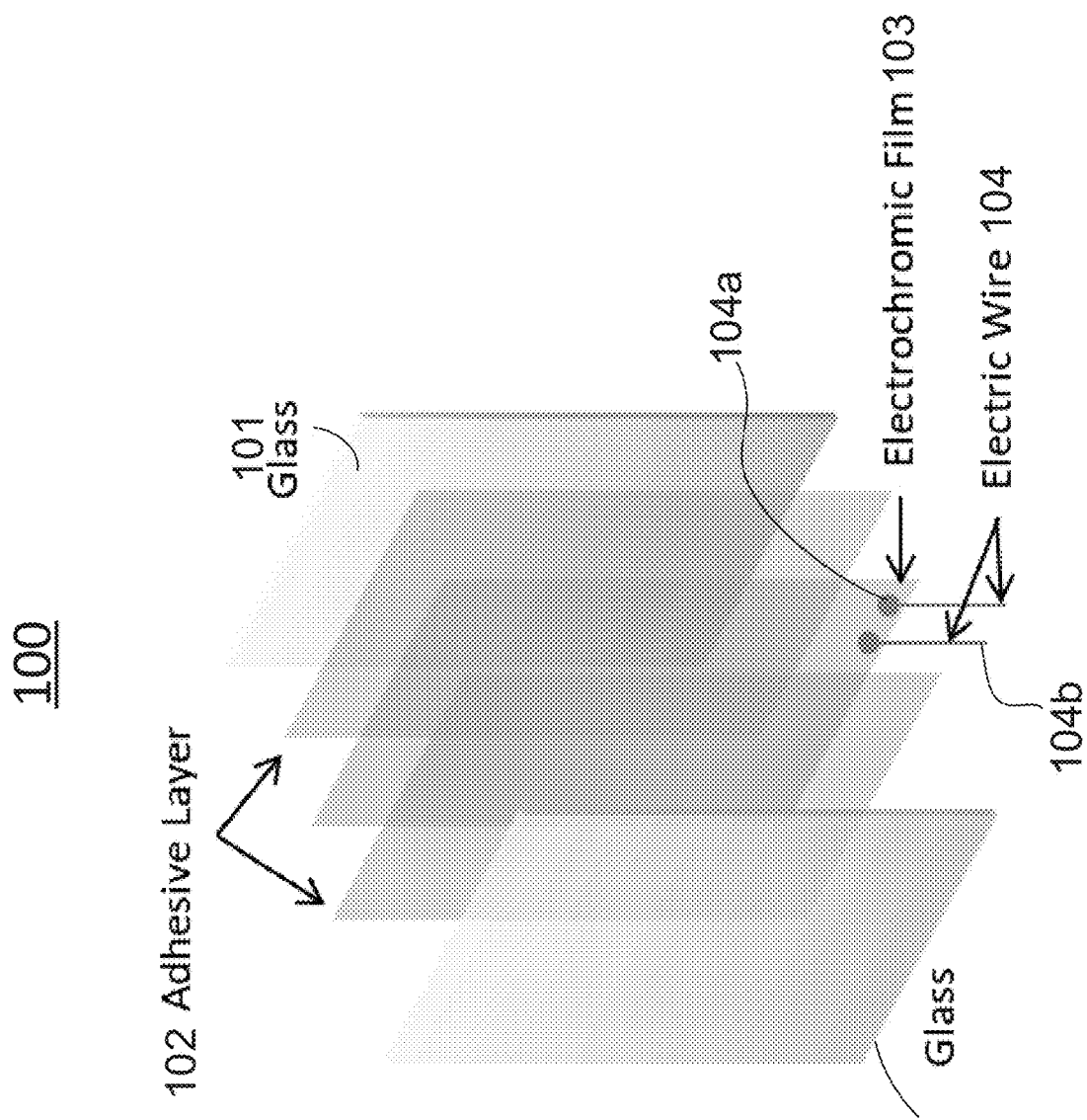
FIG. 1 is a graphical presentation illustrating a simplified schematic of an electrochromic device, consistent with exemplary embodiments of the present disclosure.
Figure 3:
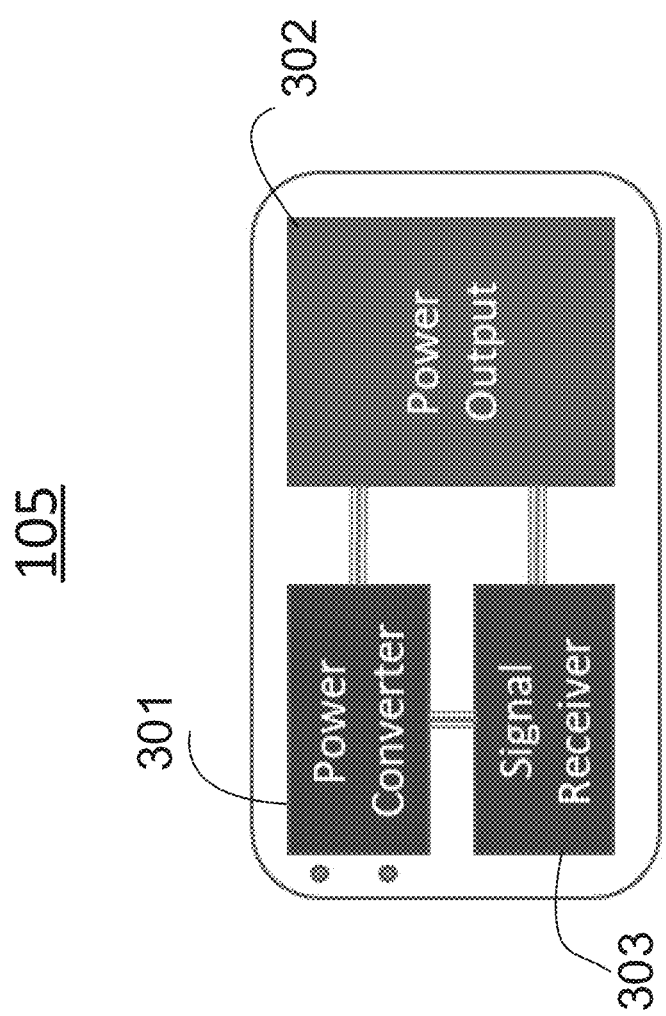
FIG. 3 is a graphical presentation illustrating a controller, consistent with exemplary embodiments of the present disclosure.

Electrochromic materials are commonly used in electrochromic devices. FIG. 1 is a graphical illustration showing a simplified schematic of an electrochromic device 100 (e.g., a smart window), consistent with exemplary embodiments of the present disclosure. The electrochromic device 101 may include two layers of glass 101, two adhesive layers 102, an electrochromic film 103, one or more electric wires 104, and a controller 105 (as shown in FIG. 3).

The electrochromic film 103 is sandwiched between the two layers of glass 101. The adhesive layers 102 are configured to attached the electrochromic film 103 to the layers of glass 101. The integration of the electrochromic film 103 with the window (layers of glass 101) is described in details in patent application U.S. Ser. No. 15/399,852, which is incorporated herein by reference.

One end 104a of the electric wires 104 is electrically connected to the electrochromic film 103. The other end 104b of the electric wires 104 is electrically connected to the controller 105. The controller 105 may be configured to control the state of the electrochromic device 100 by controlling the states of the electrochromic film 103. The controller 105 may be placed outside the glass 101, or laminated between the two layers of glass 101 similar to the electrochromic film 103.

In some embodiments, the adhesive layers 102 may include a polymeric material, particularly a thermosetting polymer material. Suitable thermoset polymer materials may include, but are not limited to, polyvinyl butyral (PVB), ethylene-vinyl acetate (EVA), polyurethanes, etc. In some embodiments, the two adhesive layers may comprise a material that not only is configured to bond the electrochromic film thereto, but is also transparent. The two adhesive layers may use the same materials or different materials.

The electrochromic film 103 comprises a solid electrolyte disposed therein, according to one embodiment. The detailed structure of the electronic film 103 is shown in FIG. 2 and described in detail below.

The exemplary electrochromic device 100 shown in FIG. 1 can be the electrochromic devices described in the specification and shown in the other figures.

Figure 2:
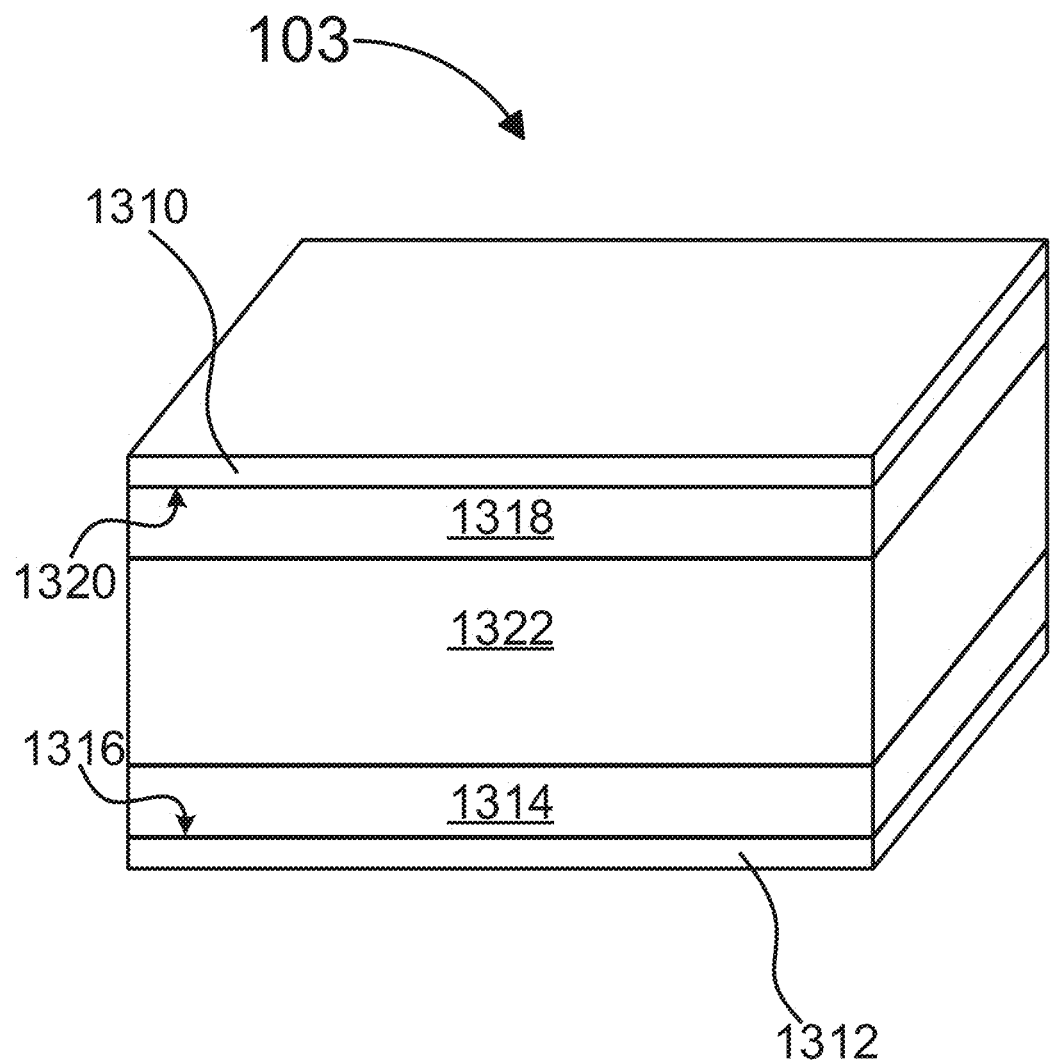
FIG. 2 is a sectional view of a simplified schematic of an electrochromic device comprising a solid polymer electrolyte therein, consistent with exemplary embodiments of the present disclosure.

As shown in FIG. 2, the electrochromic film 103 may include a first transparent electrically conductive film 1312 and a second transparent electrically conductive film 1310. The first and second electrically conductive films 1312, 1310 may have the same or different dimensions, comprise the same or different material, etc. In some embodiments, the first and second transparent electrically conductive films may be adhesive films as shown in FIG. 1. In some other embodiments, the first and second transparent electrically conductive films may be additional films. The first and second electrically conductive films 1312, 1310 may also each independently have a single layer or multilayer structure. Suitable material for the first and second electrically conductive films 1312, 1310 may include, but is not limited to, tin doped indium oxide (ITO), fluorine doped indium oxide, antimony doped indium oxide, zinc doped indium oxide, aluminum doped zinc oxide, silver nano wire, metal mesh, combinations thereof, and/or other such transparent material exhibiting sufficient electrical conductance. In preferred aspects, the first and second electrically conductive films 1312, 1310 may comprise ITO.

As further shown in FIG. 2, a layer 1314 of electrochromic material is deposited on an interior surface 1316 of the first electrically conductive film 1312. The layer 1314 of electrochromic material is configured to effect a reversible color change upon reduction (gain of electrons) or oxidation (loss of electron) caused by an electrical current. In some embodiments, the layer 1314 of electrochromic material may be configured to change from a transparent state to a colored state, or from a colored state to another colored state, upon oxidation or reduction. In some embodiments, the layer 1314 of electrochromic material may be a polyelectrochromic material in which more than two redox states are possible, and may thus exhibit several colors.

In some embodiments, the layer 1314 of electrochromic material may comprise an organic electrochromic material, an inorganic electrochromic material, a mixture of both, etc. The layer 1314 of electrochromic material may also be a reduction colored material (i.e., a material that becomes colored upon acquisition of electrons), or an oxidation colored material (i.e., a material that becomes colored upon the loss of electrons).

In some embodiments, the layer 1314 of electrochromic material may include a metal oxide such as $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, etc. In some embodiments, the layer 1314 of electrochromic material may include a conductive polymer such as poly-3,4-ethylenedioxy thiophene (PEDOT), poly-2,2'-bithiophene, polypyrrole, polyaniline (PANI), polythiopene, polyisothianaphthene, poly(o-aminophenol), polypyridine, polyindole, polycarbazole, polyquinone, octacyanophthalocyanine, combinations thereof, etc. Moreover, in some embodiments, the layer 1314 of electrochromic material may include materials, such as viologen, anthraquinone, phenocyazine, combinations thereof, etc. Additional examples of electrochromic materials, particularly those including multicolored electrochromic polymers, may be found in U.S. Patent Application No. 62/331,760, filed May 4, 2016, titled Multicolored Electrochromic Polymer Compositions and Methods of Making and Using the Same, and U.S. patent application Ser. No. 15/399,839, filed on Jan. 6, 2017, titled Multicolored Electrochromic Polymer Compositions and Methods of Making and Using the Same. The entirety of the above-referenced two applications are herein incorporated by reference.

As additionally shown in FIG. 2, a charge storage layer 1318 is deposited on an interior surface 1320 of the second electrically conductive film 1310. Suitable materials for the charge storage layer 1318 may include, but are not limited to, vanadium oxide, binary oxides (e.g., $CoO$, $IrO_2$, $MnO$, $NiO$, and $PrO_x$), ternary oxides (e.g., $Ce_xV_yO_z$), etc.

In some embodiments, the charge storage layer 1318 may be replaced with an optional second layer of electrochromic material. This optional second layer of electrochromic material may have the same or different dimensions, comprise the same or different composition, etc., as the first layer 1314 of electrochromic material.

The electrochromic film 103 also includes an electrolyte layer 1322 positioned between the layer 1314 of electrochromic material and the charge storage layer 1318. In some embodiments, the electrolyte layer 1322 may include a liquid electrolyte as known in the art. In some embodiments, the electrolyte layer 1322 may include a solid state electrolyte, including but not limited to, $Ta_2O_5$, $MgF$, $Li_3N$, $LiPO_4$, $LiBO_2$—$Li_2SO_4$, etc. In some embodiments, the electrolyte layer 1322 may include a polymer based electrolyte comprising an electrolyte salt (e.g., LiTFSI, $LiPF_6$, $LiBF_4$, $LiClO_4$, $LiCF_3SO_3$, $LiN(CF_3SO_2)_2$, $LiSbFg$, $LiAsF_6$, $LiN(CF_3CF_2SO_2)_2$, $(C_2H_5)_4NBF_4$, $(C_2H_5)_3CH_3NBF_4$, LiI, etc.), a polymer matrix (e.g., polyethylene oxide, poly(vinylidene fluoride (PVDF), poly(methyl methacrylate) (PMMA), polyethylene oxide (PEO), poly(acrylonitrile) (PAN), polyvinyl nitrile, etc.), and one or more optional plasticizers (e.g., glutaronitrile, succinonitrile, adiponitrile, fumaronitrile, etc.).

In some embodiments, the electrolyte layer 1322 comprises a solid polymer electrolyte. In one embodiment, the solid polymer electrolyte comprises a polymer framework, at least one solid plasticizer, and at least one electrolyte salt. In some embodiments, the polymer framework may include a polar polymer material having an average molecular weight of about 10,000 Daltons or greater. In particular embodiments, the polar polymer material may have an average molecular weight in a range from about 10,000 Daltons to about 800,000,000 Daltons. In some embodiments, the polar polymer material may be present in an amount ranging from about 15 wt. % to about 80 wt. % based on the total weight of the solid polymer electrolyte.

The aforementioned polar polymer material may include one or more polar polymers, each of which may include one or more of: C, N, F, O, H, P, F, etc. Suitable polar polymers may include, but are not limited to, polyethylene oxide, poly(vinylidene fluoride-hexafluoropropylene, poly(methyl methacrylate), polyvinyl nitrile, combinations thereof, etc. In embodiments where a plurality of polar polymers is present, the polymers may be crosslinked to form a network having enhanced mechanical properties.

The polar polymer material may have a sufficient amorphicity so as to achieve sufficient ion conductivity. Amorphous polymer materials typically exhibit high ion conductivities. Accordingly, in some embodiments, the polar material disclosed herein may have an amorphous, or a substantially amorphous, microstructure.

In some embodiments, the polar polymer material may have a semi-crystalline or crystalline microstructure. In such cases, various modifications may be implemented with respect to the polymer material to suppress the crystallinity thereof. For instance, one modification may involve use of branched polar polymers, linear random copolymers, block copolymers, comb polymers, and/or star-shaped polar polymers. Another modification may include incorporation of an effective amount of solid plasticizers in the polar polymer material, as discussed in greater detail below.

Various properties of the polar polymer material also may be selected and/or modified to maximize ion conductivity. These properties may include, but are not limited to, glass transition temperature, segmental mobility/flexibility of the polymer backbone and/or any side chains attached thereto, orientation of the polymers, etc.

As noted above, the presently disclosed solid electrolyte may include at least one solid plasticizer. The at least one solid plasticizer may be substantially miscible in the polymer framework of the solid plasticizer. The at least one solid plasticizer may include an organic material (e.g., small, solid organic molecules) and/or an oligomeric polymer material, in some embodiments. In various embodiments, the at least one solid plasticizer may be selected from the group including glutaronitrile, succinonitrile, adiponitrile, fumaronitrile, and combinations thereof.

In some embodiments, a plurality of solid plasticizers may be present in the polymer framework, where each plasticizer may independently include an organic material (e.g., small, solid organic molecules) and/or an oligomeric polymer material. Particularly, each plasticizer may independently be glutaronitrile, succinonitrile, adiponitrile, fumaronitrile, etc. Moreover, the dimensions of at least two, some, a majority, or all of the plasticizers may be the same or different as one another.

In some embodiments, the total amount of solid plasticizer may be in a range from about 20 wt. % to about 80 wt. % based on the total weight of the solid electrolyte.

As additionally noted above, the solid polymer electrolyte may include at least one electrolyte salt. In some embodiments, the at least one electrolyte salt may comprise an organic salt. In some embodiments, the at least one electrolyte salt may comprise an inorganic salt. Suitable electrolyte salts may include, but are not limited to, LiTFSI, $LiPF_6$, $LiBF_4$, $LiClO_4$, $LiCF_3SO_3$, $LiN(CF_3SO_2)_2$, $LiSbFg$, $LiAsF_6$, $LiN(CF_3CF_2SO_2)_2$, $(C_2H_5)_4NBF_4$, $(C_2H_5)_3CH_3NBF_4$, LiI, combinations thereof, etc. In some embodiments, the total amount of electrolyte salt may be in a range from about 10 wt. % to about 50 wt. % based on the total weight of the solid electrolyte.

The solid polymer electrolyte is distinguishable from conventional liquid electrolytes, as well as gel polymer electrolytes including an ionic liquid therein. In other words, the presently disclosed solid polymer electrolyte may be an all solid polymer electrolyte, and does not include any liquid or gel components therein. The presently disclosed solid polymer electrolyte may also be transparent in some aspects. Additionally, the solid polymer electrolyte may have an ion conductivity in a range from about $10^{-7}$ S/cm to about $10^{-3}$ S/cm.

Methods of making the presently disclosed solid polymer electrolyte may include synthesis, polymerization, solvation, etc. processes as known in the art. In one particular, non-limiting embodiment, a method of making the presently disclosed polymer electrolyte may include: (a) combining the polymer framework, the at least one plasticizer, and the at least one electrolyte salt in an appropriate solvent; and (b) removing the solvent to obtain the solid polymer electrolyte. Exemplary solvents may include, but are not limited to, acetone, methanol, tetrahydrofuran, etc. In some embodiments, one or more experimental parameters may be optimized to facilitate the dissolving of the polymer framework, plasticizer, and electrolyte salt in the solvent. These experimental parameters may include the components remain in the solvent, agitation/stirring of the solvent, etc.

In some embodiments, the electrolyte layer 1322 of FIG. 2 comprises a solid polymer electrolyte, such as the solid polymer electrolytes described above, and does not include any liquid or gel electrolyte. Such a solid polymer electrolyte (i) has sufficient mechanical strength yet is versatile in shape so as to allow easy formation into thin films, and thin-film shaped products; (ii) avoids issues related to adhesion and print processing affecting conventional electrolytes; (iii) provides stable contact between the electrolyte/electrode interfaces (those with and without the electrochromic material coating thereon); (iv) avoids the problem of leakage commonly associated with liquid electrolytes; (v) has desirable non-toxic and non-flammable properties; (vi) avoids problems associated with evaporation due to its lack of vapor pressure; (vii) exhibits improved ion conductivities as compared to convention polymer electrolytes; etc.

Additional examples of electrolyte materials, particularly those including solid polymer electrolytes, may be found in U.S. Patent Application No. 62/323,407, filed Apr. 15, 2016, titled Solid Polymer Electrolyte for Electrochromic Devices, and U.S. patent application Ser. No. 15/487,325, filed on Apr. 13, 2017, titled Solid Polymer Electrolyte for Electrochromic Devices. The entirety of the above-referenced two applications are herein incorporated by reference.

The electrochromic film 103 may be used in various applications and/or in permutations, which may or may not be noted in the illustrative embodiments/aspects described herein. For instance, the electrochromic film 103 may include more or less features/components than those shown in FIG. 2, in some embodiments. Additionally, unless otherwise specified, one or more components of the electrochromic film 103 may be of conventional material, design, and/or fabricated using known techniques (e.g., sputtering, chemical vapor deposition (CVD), physical vapor deposition (PVD), plasma-enhanced chemical vapor deposition (PECVD), spray coating, slot-die coating, dip coating, spin coating, printing, etc.), as would be appreciated by skilled artisans upon reading the present disclosure.

FIG. 3 is a graphical presentation illustrating a controller 105, consistent with exemplary embodiments of the present disclosure. The controller 105 may include a power converter 301, a power output control 302, and a signal receiver 303. The power converter 301 may convert input power from a power source to the power required by the signal receiver 303 and the power output control 302. The power source could be either a power source integrated with the controller 105 as a self-contained, self-powered unit, or an external power source, provided by, for example, power of a building where the electrochromic device is installed. The power output control 302 may be configured to supply power to the electrochromic film 103. In particular, the power output 302 may be configured to supply voltage between the first and second electrically conductive films 1312, 1310. Since the state of the electrochromic film 103 is driven by electric charges, the power output control 302 can inject into or extract a certain amount of electric charges from the electrochromic film 103 based on the signals the signal receiver 303 receives, in order to change the state of the electrochromic film 103. The signal receiver 303 may be configured to receive signals sent to the controller 105, and transfer the signals to the power output control 302. In some embodiments, the signal receiver 303 may be connected to an external switch and a central switch to provide both local and global controls of the electrochromic device 100.

In the present application, we propose different methods for changing optical states of electrochromic materials. The optical states of electrochromic materials can be changed by injecting or extracting electric charges into the electrochromic films. Both voltage driving and current driving can be employed to inject/extract electric charges. In addition, the combination of voltage driving and current driving can also be employed. Further, the voltage driving and the current driving can be operated at either direct current (DC) or alternating current (AC). As long as the required amount of electric charges are injected or extracted, the electrochromic film can be set at a certain optical state.

Changing Electrochromic Film's Optical State by Voltage Driving

In one embodiment, changing the optical state of an electrochromic film can be operated by a DC voltage. An external power supply outputs a constant voltage to the electrochromic film. The current through the film and the film's light transmission can be monitored over time. By applying the constant voltage, the charges are injected into the electrochromic film, inducing oxidation of the film, thereby changing its optical state.

Example 1

Figure 4:
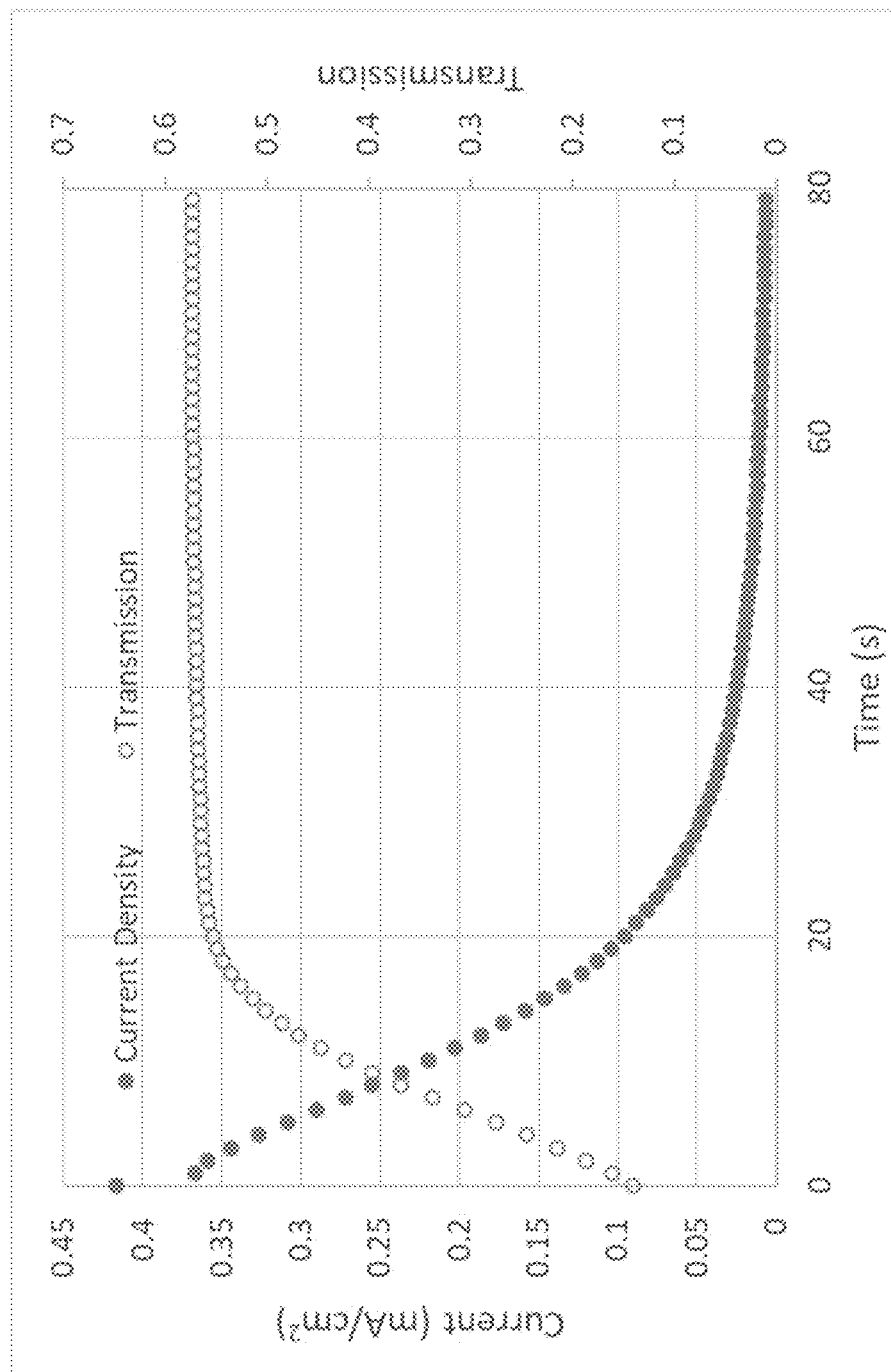
FIG. 4 is a graph illustrating a response of an exemplary electrochromic film changing from a dark state to a clear state under a constant voltage, consistent with exemplary embodiments of the present disclosure.

An exemplary electrochromic film is operated under a constant voltage of 1.5 V. FIG. 4 presents the response of the electrochromic film changing from a dark state (with minimum transmission) to a clear state (with maximum transmission) under a constant voltage. As shown in FIG. 4, the current density of electrochromic film continues decreasing over time, while the transmission of the electrochromic film increases as the voltage applied and becomes saturated after 20 s. This may indicate that the electrochromic film only requires certain amount of charges to change its state.

Figure 5:
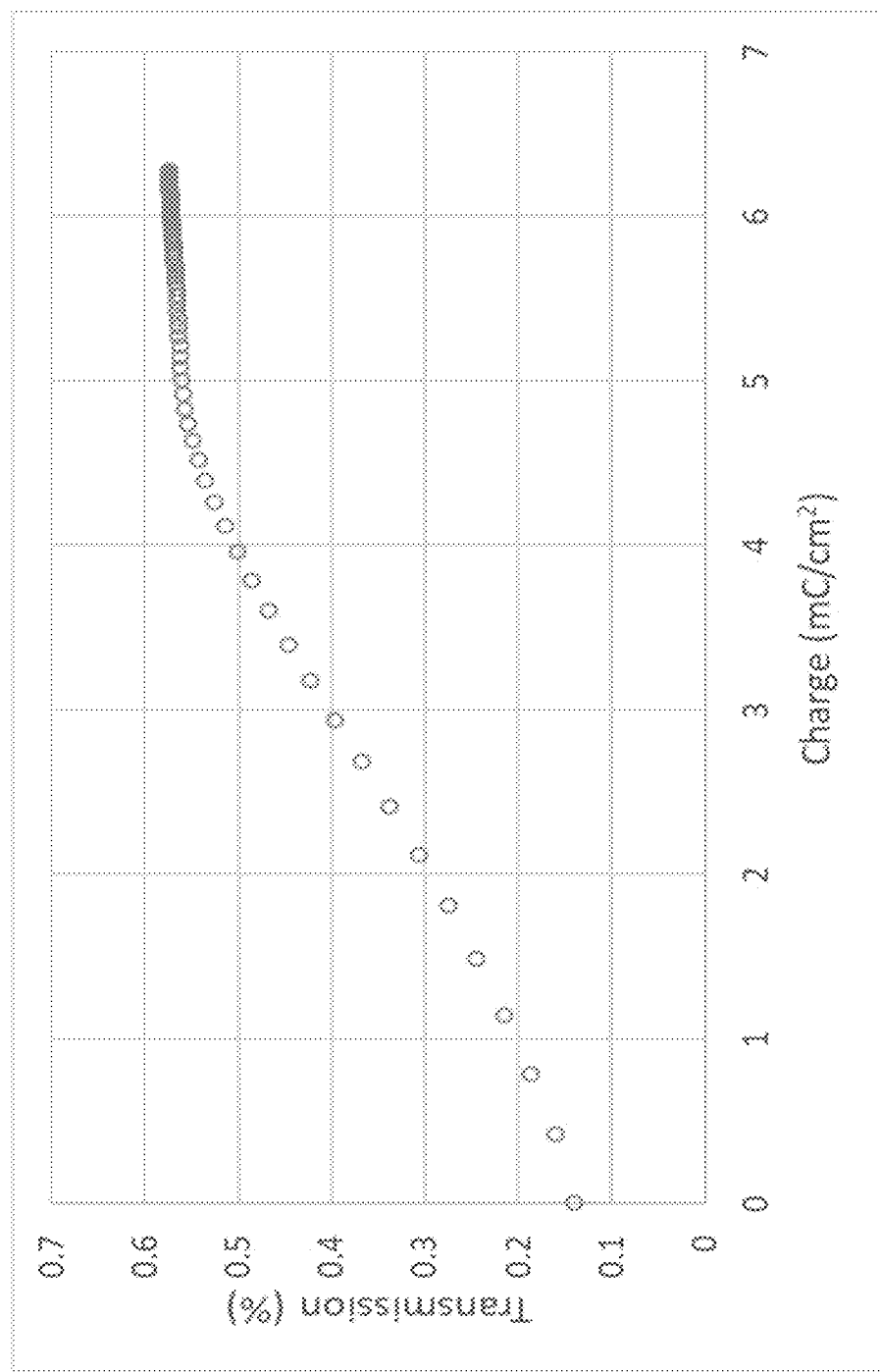
FIG. 5 is a graph illustrating dependence of transmission of an exemplary electrochromic film on the amount of injected charges under a constant voltage, consistent with exemplary embodiments of the present disclosure.

FIG. 5 shows dependence of the transmission of the electrochromic film on the amount of injected charges under a constant voltage. The transmission of the electrochromic film increases as the amount of injected charges increases. By controlling the amount of the charges injected into the electrochromic film, the transmission of the electrochromic film can be adjusted accordingly. Thus, the transmission of the electrochromic film can be set at any state by injecting a certain amount of charges. For example, if the transmission of the electrochromic film is to be set at 40% from the dark state, a charge density of about 3 mC/cm$^2$ is needed to inject into the electrochromic film.

In another embodiment, to change the state of an electrochromic film from a clear state back to a dark state, the polarity of the external voltage can be switched. By switching the polarity of the external voltage, the charges can be extracted from the electrochromic film, inducing reduction of the electrochromic film, thereby changing its state.

Example 2

Figure 6:
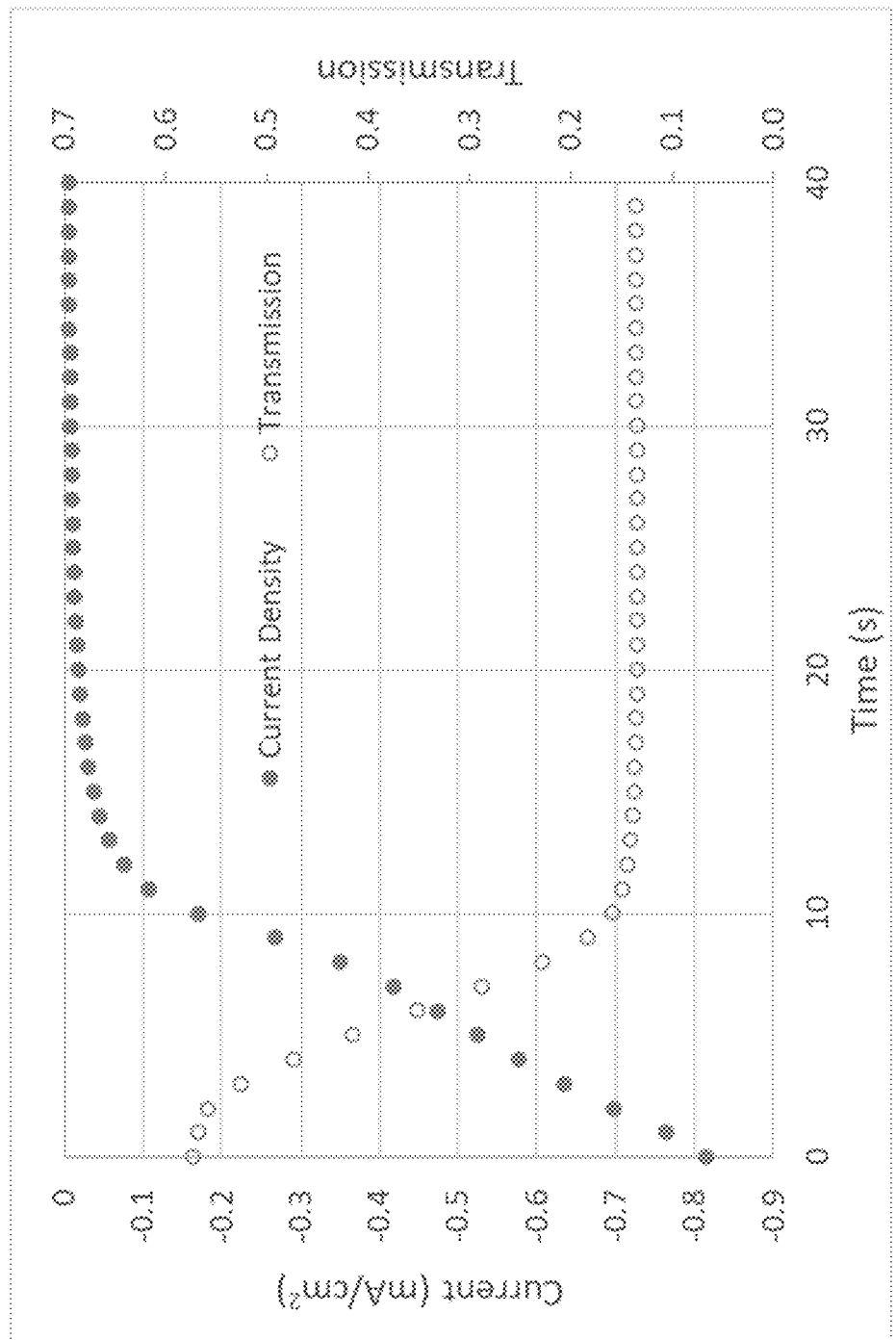
FIG. 6 is a graph illustrating a response of an exemplary electrochromic film changing from a clear state to a dark state under a constant voltage, consistent with exemplary embodiments of the present disclosure.

Another exemplary electrochromic film is operated under a constant voltage of 1 V. FIG. 6 presents the response of the exemplary electrochromic film changing from a clear state (with maximum transmission) to a dark state (with minimum transmission) under a constant voltage. As shown in FIG. 6, negative current density indicates that the charge is extracted from the electrochromic film. As the current density drops to zero, the transmission of the electrochroinic film decreases from the maximum to the minimum.

Figure 7:
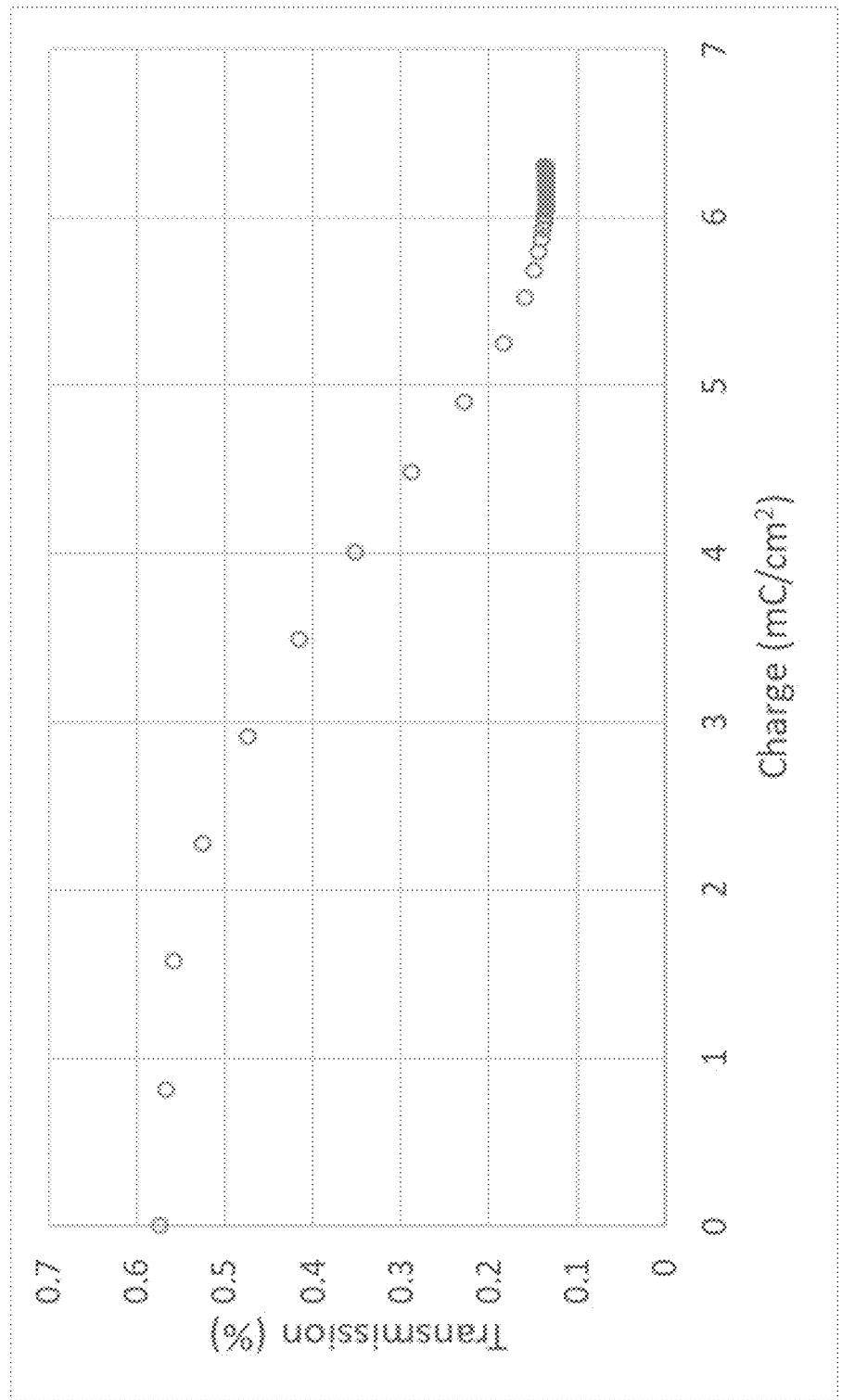
FIG. 7 is a graph illustrating dependence of transmission of an exemplary electrochromic film on the amount of extracted charges under a constant voltage, consistent with exemplary embodiments of the present disclosure.

FIG. 7 shows dependence of the transmission of the electrochromic film on the amount of extracted charges under a constant voltage. The transmission of the electrochromic film decreases as the amount of extracted charges increases. By controlling the amount of charges extracted from the electrochromic film, the transmission of the electrochroinic film can be adjusted accordingly. The transmission of the electrochromic film can be set at any state by extracting a certain amount of charges. For example, if the transmission of the electrochromic film is to be set at 35% from the clear state, a charge density of about 4 mC/cm$^2$ should be set in the electrochromic film.

Changing Electrochromic Film's Optical State by Current Driving

In another embodiment, changing the optical state of an electrochromic film can be operated by constant DC current. An external power supply outputs a constant current to the electrochromic film. The current through the film and the film's transmission can be monitored over time. By applying the constant current, the charges are injected into the electrochromic film, inducing oxidation of the film, thereby changing its optical state.

Example 3

Figure 8:
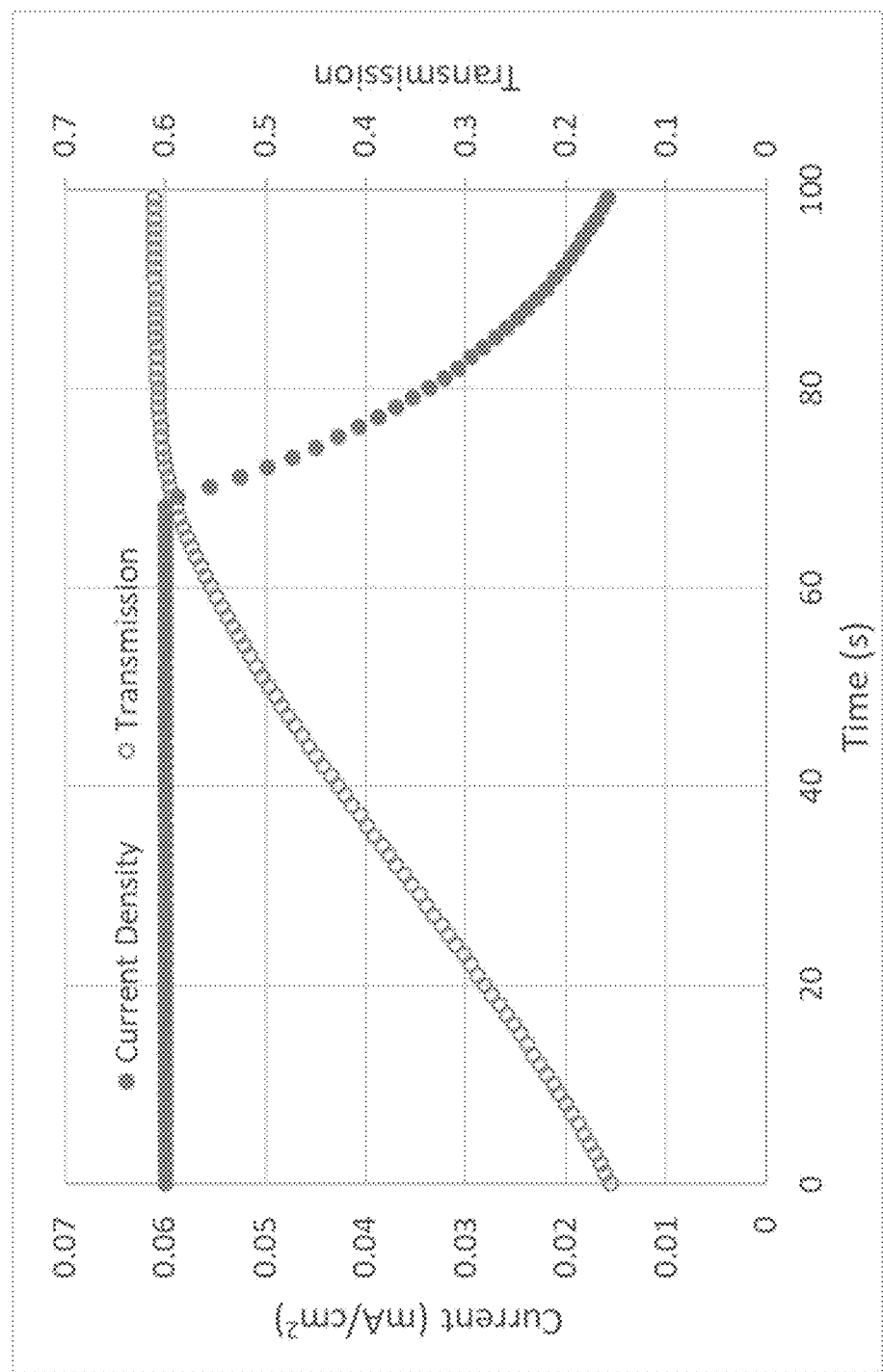
FIG. 8 is a graph illustrating a response of an exemplary electrochromic film changing from a dark state to a clear state under a constant current, consistent with exemplary embodiments of the present disclosure.

Another exemplary electrochromic film is operated under a constant current of 0.06 mA/cm$^2$. FIG. 8 presents the response of the exemplary electrochromic film changing from a dark state (with minimum transmission) to a clear state (with maximum transmission) under a constant current. As shown in FIG. 8, the transmission of the electrochromic film changes as the constant current supplied, and becomes saturated after around 70 s. The constant current sharply drops near when the film's transmission reaches the maximum. Since the amount of the charges injected equals the current times the time, this may indicate that after the state of the electrochromic film is totally switched from a clear state to a dark state, there's no need for any additional charge injection. Thus, by controlling the amount of the charges injected, the transmission of the electrochromic film can be adjusted.

Figure 9:
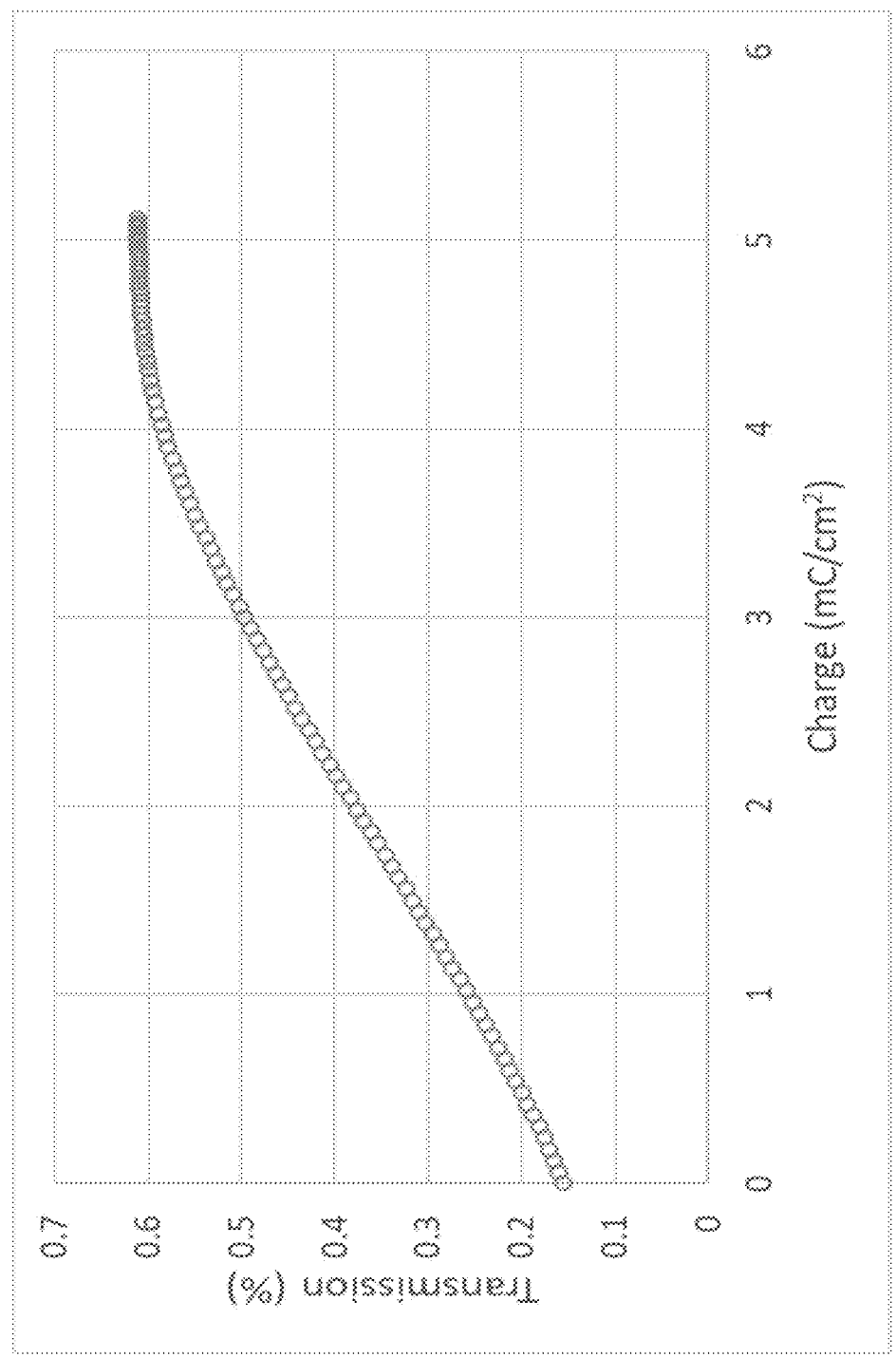
FIG. 9 is a graph illustrating dependence of transmission of an exemplary electrochromic film on the amount of injected charges under a constant current, consistent with exemplary embodiments of the present disclosure.

FIG. 9 shows dependence of the transmission of the electrochromic film on the amount of the injected charges under a constant current. The transmission of the electrochromic film increases as the amount of the injected charges increases. By controlling the amount of charges injected into the electrochromic film, the transmission of electrochromic film can be adjusted accordingly. The transmission of the electrochromic film can be set at any state by injecting a certain amount of charges. For example, if the transmission of electrochromic film is to be set at 50% from the dark state, a charge density of about 3 mC/cm$^2$ is needed to inject into the electrochromic film.

In another embodiment, to change the state of an electrochromic film from a clear state back to a dark state, the polarity of the external current can be switched. By switching the polarity of the external current, the charges can be extracted from the electrochromic film, inducing reduction of the electrochromic film, thereby changing its state.

Example 4

Figure 10:
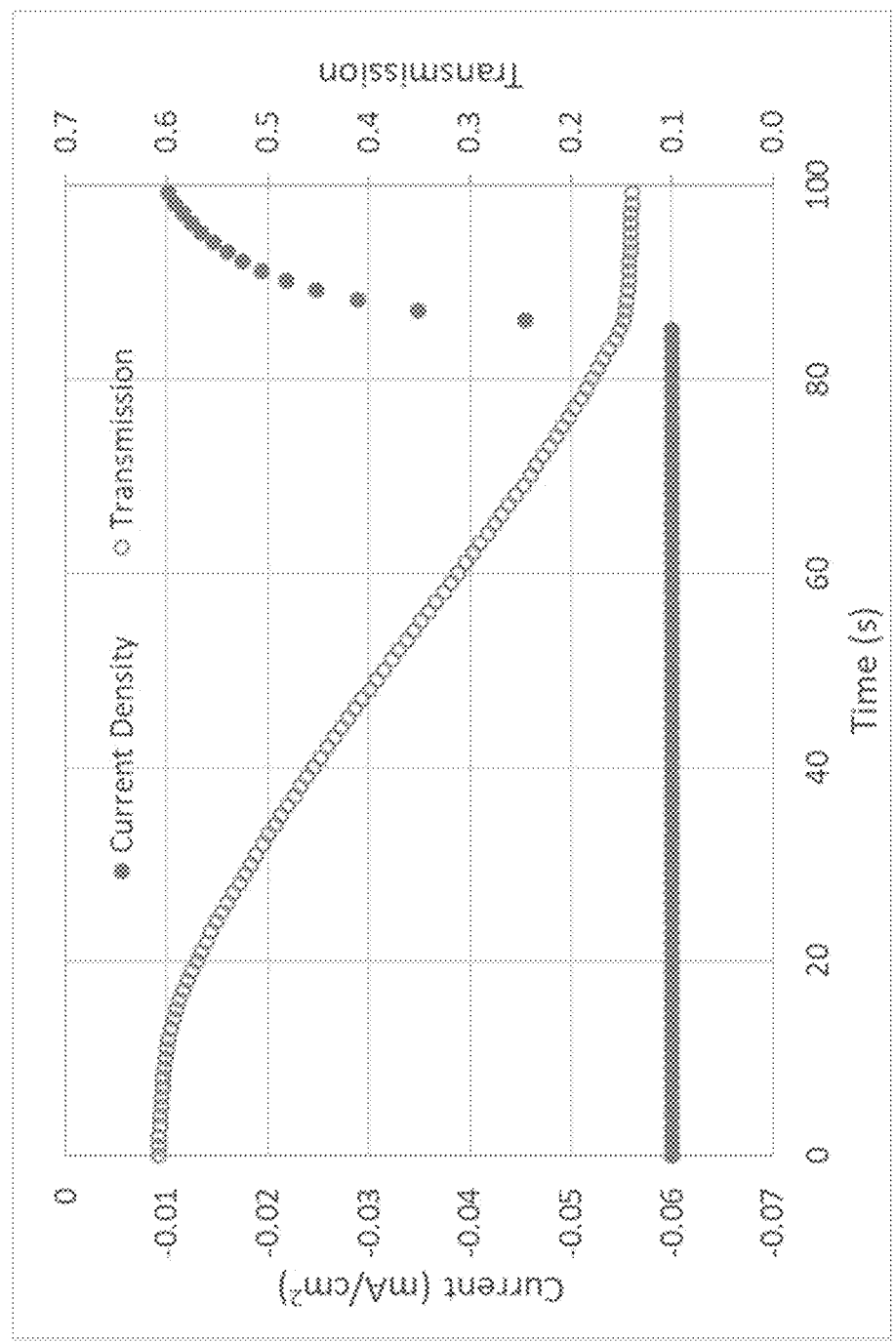
FIG. 10 is a graph illustrating a response of an exemplary electrochromic film changing from a clear state to a dark state under a constant current, consistent with exemplary embodiments of the present disclosure.

Another exemplary electrochromic film is operated under a constant current of 0.06 mA/cm$^2$. FIG. 10 presents the response of the exemplary electrochromic film changing from a clear state (with maximum transmission) to a dark state (with minimum transmission) under a constant current. As shown in FIG. 10 negative current density indicates that the charge is extracted from the electrochromic film. The transmission of the electrochromic film changes as the constant current supplied. The constant current sharply drops near when the transmission of the electrochromic film reaches the minimum, Since the amount of charges extracted equals the current times the time, this may indicate that after the state of the electrochromic film is totally switched from the clear state to the dark state, there's no need for any additional charge extraction. Thus, by controlling the amount of the charges extracted, the transmission of the electrochromic film can be adjusted.

Figure 11:
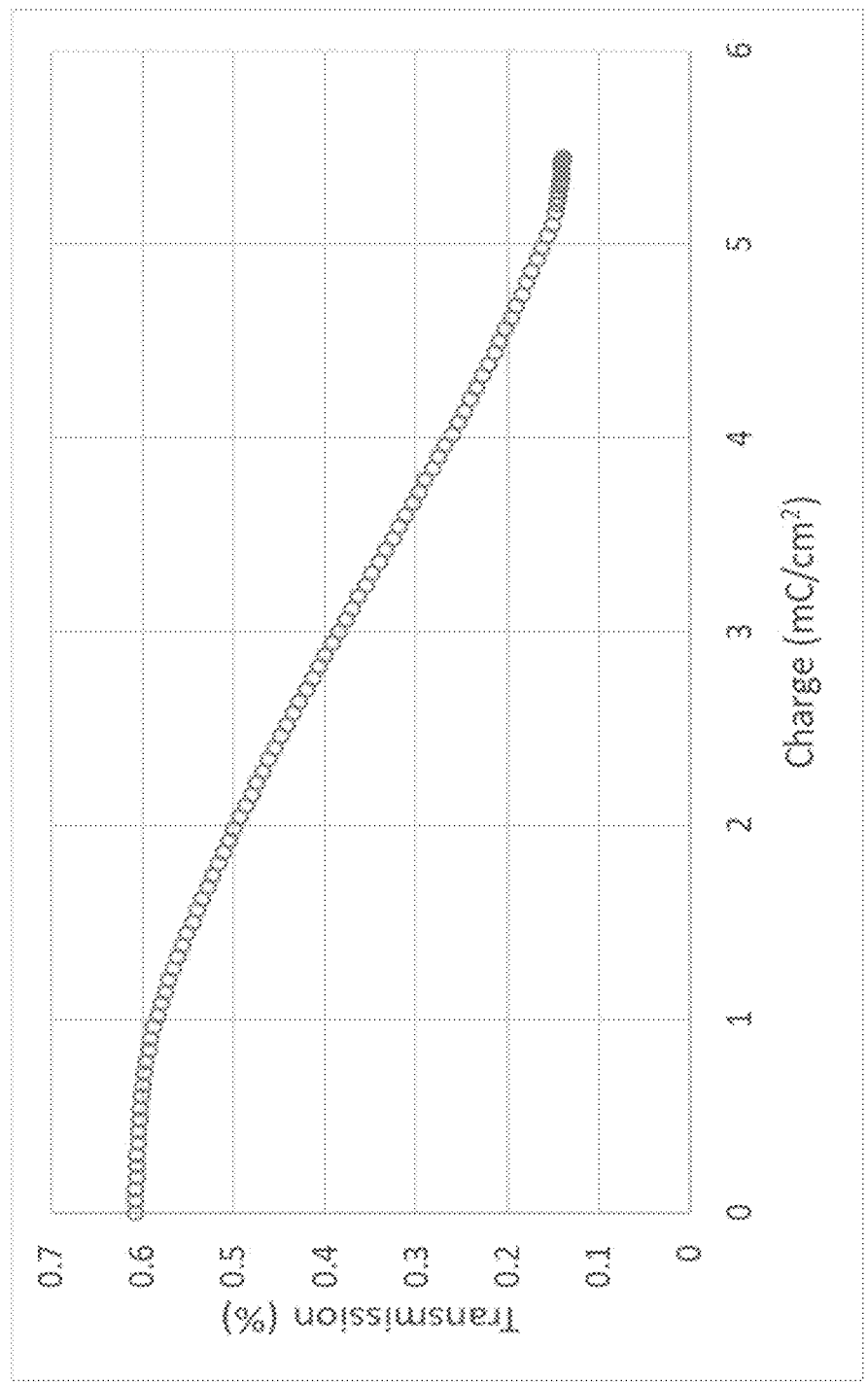
FIG. 11 is a graph illustrating dependence of transmission of an exemplary electrochromic film on the amount of extracted charges under a constant current, consistent with exemplary embodiments of the present disclosure.

FIG. 11 shows dependence of the transmission of the electrochromic film on the extracted charges under a constant current. The transmission of the electrochromic film decreases as the amount of the extracted increases. By controlling the amount of charges extracted from the electrochromic film, the transmission of the electrochromic film can be adjusted accordingly. The transmission of the electrochromic film can be set at any state by extracting a certain amount of charges. For example, if the transmission of the electrochromic film is to be set at 40% from the clear state, a charge density of about 3 mC/cm$^2$ should be set in the electrochromic film.

In this disclosure, we present methods of changing optical states of electrochromic materials with constant voltage driving and constant current driving. It should also be well understood that combination of voltage driving and current driving, pulsed voltage driving and current driving, combination of pulsed and DC driving, etc. can also be employed to change electrochromic materials to a desired optical state. As long as a certain amount of charges is injected into or extracted from an electrochromic material, the optical state of the electrochromic material can be adjusted accordingly.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method of changing an optical state of an electrochromic film, wherein the electrochromic film has a plurality of optical states, comprising:
    selecting a desired state of the plurality of optical states;
    injecting electric charges into the electrochromic film by a driving force, wherein the driving force includes voltage driving, current driving, and/or a combination of voltage driving and current driving;
    determining the driving force based on the desired state of the plurality of optical states;
    monitoring an amount of the electric charges injected into the electrochromic film; and
    stopping injecting the electric charges when the electric charges reaches a pre-set amount corresponding to the desired state.

2. The method of claim 1, wherein the voltage driving comprises applying an external DC voltage to the electrochromic film.

3. The method of claim 1, wherein the current driving comprises applying an external DC current to the electrochromic film.

4. The method of claim 1, wherein the voltage driving comprises applying an external pulsed voltage to the electrochromic film.

5. The method of claim 1, wherein the current driving comprises applying an external pulsed current to the electrochromic film.

6. The method of claim 1, wherein injecting electric charges into the electrochromic film comprises applying a combination of an external voltage and an external current to the electrochromic film.

7. The method of claim 1, wherein injecting electric charges into the electrochromic film comprises applying a combination of a constant power source and a pulsed power source to the electrochromic film.

8. A method of changing an optical state of an electrochromic film, wherein the electrochromic film has a plurality of optical states, comprising:
selecting a desired state of the plurality of optical states;
extracting electric charges from the electrochromic film by a driving force, wherein the driving force includes voltage driving, current driving, and/or a combination of voltage driving and current driving;
determining the driving force based on the desired state of the plurality of optical states;
monitoring an amount of the electric charges extracted from the electrochromic film; and
stopping extracting the electric charges when the electric charges reaches a pre-set amount corresponding to the desired state.

9. The method of claim 8, wherein the voltage driving comprises applying an external DC voltage to the electrochromic film.

10. The method of claim 8, wherein the current driving comprises applying an external DC current to the electrochromic film.

11. The method of claim 8, wherein the voltage driving comprises applying an external pulsed voltage to the electrochromic film.

12. The method of claim 8, wherein the current driving comprises applying an external pulsed current to the electrochromic film.

13. The method of claim 8, wherein extracting electric charges from the electrochromic film comprises applying a combination of an external voltage and an external current to the electrochromic film.

14. The method of claim 8, wherein extracting charges into the electrochromic film comprises applying a combination of a constant power source and a pulsed power source to the electrochromic film.

15. A method of changing an optical state of an electrochromic film, comprising:
setting a plurality of pre-determined optical states of the electrochromic film;
determining an amount of electric charges corresponding to each of the plurality of pre-determined optical states;
selecting a desired state of the plurality of pre-determined optical states; and
determining a driving force, wherein the driving force includes voltage driving, current driving, and/or a combination of voltage driving and current driving;
adjusting an amount of electric charges within the electrochromic film to the determined amount of electric charges corresponding to the selected desired state.

16. The method of claim 15, wherein adjusting the amount of electric charges within the electrochromic film comprises applying the voltage driving, the voltage driving including an external DC voltage, an external pulsed voltage, or combination thereof to the electrochromic film.

17. The method of claim 15, wherein adjusting the amount of electric charges within the electrochromic film comprises applying the current driving, the current driving including an external DC current, an external pulsed current, or a combination thereof to the electrochromic film.

18. The method of claim 15, wherein adjusting the amount of electric charges within the electrochromic film comprises applying a combination of an external voltage and an external current to the electrochromic film.

19. The method of claim 18, wherein the external voltage includes DC voltage and pulsed voltage, and the external current includes DC current and pulsed current.

20. The method of claim 15, wherein the plurality of pre-determined optical states include a clear state and a dark state of the electrochromic film.

* * * * *